(12) United States Patent  
Richter

(10) Patent No.: US 7,869,127 B2  
(45) Date of Patent: Jan. 11, 2011

(54) PRECISION POLARIZATION OPTIMIZED OPTICAL BEAM PROCESSOR

(75) Inventor: Dirk Richter, Boulder, CO (US)

(73) Assignee: University Corporation for Atmospheric Research, Boulder, CO (US)

( * ) Notice: Subject to any disclaimer, the term of this patent is extended or adjusted under 35 U.S.C. 154(b) by 0 days.

(21) Appl. No.: 11/276,874

(22) Filed: Mar. 17, 2006

(65) Prior Publication Data

US 2007/0217009 A1    Sep. 20, 2007

(51) Int. Cl.
G02B 27/28    (2006.01)
(52) U.S. Cl. ....................................... 359/487; 359/495
(58) Field of Classification Search ................. 359/487, 359/494, 495
See application file for complete search history.

(56) References Cited

U.S. PATENT DOCUMENTS 6,128,133 A * 10/2000 Bergmann ................... 359/487
7,190,519 B1 * 3/2007 Kitagishi ..................... 359/485
2003/0206349 A1 * 11/2003 Gage et al. .................. 359/495

* cited by examiner

Primary Examiner—Joshua L Pritchett
(74) Attorney, Agent, or Firm—Marsh Fischmann & Breyfogle LLP

(57) ABSTRACT

A method, element and system are provide for efficiently, accurately and without significant contribution of noise, splitting a beam of radiation or combining beams of radiation. In one embodiment of the invention, a beamsplitter front surface partially reflects incident radiation and refracts the rest of the radiation. The refracted radiation is completely reflected at a back surface of the beamsplitter and is completely refracted producing a parallel beam without creating any stray radiation or optical noise. This is accomplished using a p-polarized input beam and a Brewster angle geometry.

30 Claims, 9 Drawing Sheets

PRECISION POLARIZATION OPTIMIZED OPTICAL BEAM PROCESSOR

GOVERNMENT SUPPORT

The invention was made with Government support under Cooperative Agreement No. ATM-0215702 awarded by the National Science Foundation. The Government has certain rights in this invention.

FIELD OF THE INVENTION

The present invention relates in general to optical systems, and, in particular, to systems including a beam processing element for splitting or combining beams of light. The invention has particular application with respect to optically efficient and precise beam splitting with minimal artifact such as interference fringes.

BACKGROUND OF THE INVENTION

Optical systems can be adapted to perform many functions. As elements within those optical systems, beam processing elements are useful for many applications, e.g. spectroscopy, telecommunications and interferometry. In these applications, it is often desired to employ a beam processing element to split a source beam into two or more output beams or to combine two or more optical beams into a single beam. Such elements may operate independently or in the context of an array of optical input/output ports where beams are split, combined, multiplexed, demultiplexed, added, dropped and/or otherwise processed.

The case of a beam splitter is illustrative. A beam splitter functions to separate an input beam into two or more output beams. One example of a beam splitter application is spectrographic analysis where one beam illuminates a reference sample and another beam illuminates a sample under analysis. It is desirable to generate these beams from a common source so as to simplify design and minimize artifact due to optical system differences. Accordingly, such systems may be implemented using a single source with a beamsplitter to provide the reference and sample path output beams.

There are a number of potential considerations for beamsplitter design in such contexts. For example, one consideration is efficiency or maximizing transmission of light from one part of a system to another part of the system by, for example, minimizing loss of light (visible or non-visible spectrum) due to transmission onto spurious or non-useful paths. Efficiency concerns in optical systems can be addressed at the level of each element as well as the overall system design. Efficiency is important for a number of reasons, including minimizing the required source power, limiting the need for repeaters in systems and maximizing the power of the output beams. In the application of spectroscopy, the efficiency of the beamsplitting function can affect the accuracy of measurements made of the sample and the reference, the power or range of the system for a given source, and the limits of the system's overall accuracy.

Another important consideration is noise in the optical system due to the beamsplitting function. Noise can be any type of extraneous or undesired signal component or characteristic. For instance, noise associated with the light in the system can affect its phase, its wavefront, its intensity, its polarization or any other of its characteristics. Such noise can adversely impact system performance and the accuracy of measurements, which may be of critical importance for certain applications. In the application of spectroscopy, the noise created by the beamsplitting function can, among other things, affect the accuracy of the measurements made by the system by creating differences between the sample and reference path beams that are not a function of sample or reference fluid composition. Noise can entail, for example, plane parallel cavity beam shape artifact due to certain beamsplitter designs.

Another important consideration in beamsplitter design is the accuracy with which the spatial relationship of the output beams can be controlled. Accuracy relates to, for example, controlling the spacing and other relative geometry of the output beams. Also, accuracy can encompass, for example, controlling the size, shape, intensity and other characteristics of the output beams. For example, in spectroscopy applications involving analysis of a fluid such as atmospheric gases, accurate control of the intensity and positioning of the output beams is crucial. The importance of different types of accuracy within an optical system will vary with the function of the optical system.

Other potential considerations relating to beam splitter design include the difficulty and expense of manufacturing and limiting differences in the optical pathways/elements of the beams. In the last regard, optical systems can benefit from the use of monolithic components. Systems involving multiple optical elements or otherwise non-monolithic components can entail concerns relating to, for example manufacturing precision, thermal drift of characteristics of the components and path specific artifact.

SUMMARY OF THE INVENTION

The present invention is directed to a beam processing unit for splitting or combining beams of light as well as associated optical systems and methodology. In a preferred implementation, a Brewster angle geometry is employed to avoid undesired reflections that could impair efficiency or result in artifact. In this regard, the invention allows for optically efficient beam processing, thereby reducing optical loses and potentially enhancing system performance. In addition, the invention allows for accurate beam processing such that, for example, in the case of beam splitting applications, the relative powers and spatial configuration of the output beams can be precisely controlled. Moreover, the invention enables processing of beams with reduced or substantially eliminated artifact, such as interference fringes. Additional advantages of the invention will be apparent from the description below.

In accordance with one aspect of the invention, an optical apparatus including an element with differing transmission properties on one surface is provided, for example, for use in splitting or combining beams. The element has first and second surfaces adapted to define at least three optical interfaces. More specifically, the first surface includes a first area having a first value of a transmission property and a second area having a second value of that property. For example, the first area may be partially reflective (partially transmissive) with respect to a given beam whereas the second area may be substantially wholly transmissive, e.g., the first area may have a partially reflective coating that is absent from the second area. The second surface includes a third area for at least partially redirecting a beam from the first area of the first surface to the second area of the first surface. In this manner, a beam splitter can be implemented by directing an input beam onto the first area of the first surface such that a portion of the input beam is reflected at the first surface to provide a first output beam, and a remaining portion of the input beam is transmitted through the element, internally reflected at the second surface and transmitted through the second area of the first surface to provide a second output beam. More than two output beams may be provided, for example, by disposing a partially reflective coating at the second area of the first surface. A corresponding method involves providing an optical element as described above, reflecting a portion of an incident beam at the first area of the first surface to provide a first output beam and transmitting a second portion of the incident beam at the second area of the first surface to provide a second output beam. Additionally or alternatively, the element may be used to combine multiple input beams, to multiplex and/or demultiplex signals and to drop and/or add signals from a communications pathway.

In accordance with another aspect of the present invention, a method and apparatus ("utility") is provided for processing a beam using substantially a Brewster angle geometry. The utility involves an optical element including at least a first input surface area for receiving an input optical beam and at least a first output surface area for transmitting an output beam. Multiple input and/or output beams may be accommodated. In any case, at least one output beam (i.e., a first output beam) is transmitted from the first output surface area substantially at a Brewster angle geometry. For example, the first output beam may be transmitted across the first surface area from inside the element to outside such that the first output beam exits at a Brewster angle relative to the first surface area. Brewster angle geometries may be employed at other input and/or output optical interfaces of the element. In this manner, undesired reflections can be reduced or substantially eliminated to allow for enhanced efficiency, noise reduction and output control.

In accordance with a still further aspect of the invention, an optical system employs a beam incident on a partially reflective surface at a Brewster angle. Radiation incident on a surface substantially at a Brewster angle may be, depending on polarization, substantially completely reflected or substantially completely refracted (transmitted). It is noted in this regard that the Brewster angle is dependent on such things as the wavelength of the incident beam and the refractive indices of the media involved. Due to the noted property, it may appear unproductive to employ a Brewster angle geometry in connection with an interface that is partially reflective with respect to the incident beam. That is, if the Brewster angle geometry provides substantially complete reflection of the incident beam, a partially reflective surface (e.g., coating) would appear superfluous. On the other hand, if the Brewster angle geometry is selected to provide substantially complete transmission, a partially reflective surface would appear counterproductive.

However, the present inventor has recognized that combining a partially reflective surface and a Brewster angle geometry can provide certain advantages in relation to beam processor design and operation. For example, such a configuration in the context of a beamsplitter application allows an input beam to be separated into components based substantially entirely on the reflectance characteristics of a partially reflective coating, which can be accurately controlled. Moreover, in connection with a beam splitter element including parallel front and back optical interface surfaces, such a configuration can be coupled with a Brewster angle geometry and an output surface of the element. In this manner, substantially the full power of the input beam can be transmitted in the output beams simply by leaving the exit surface uncoated. An associated utility involves providing an optical element having a partially reflective surface and transmitting an optical beam onto the partially reflective surface so as to define a Brewster angle geometry.

In one embodiment, a beam splitter in accordance with the present invention includes an input beam source, a beam splitter element, and first and second output targets. The beam splitter element includes a transmissive medium defining opposing front and back surfaces. A portion of the front surface is coated with a partially reflective coating and at least a portion of the back surface is coated with a substantially fully reflective coating. In operation, the source is operated to transmit a plane polarized input beam onto the coated portion of the front surface so as to define a Brewster angle geometry. A portion of the input beam is reflected by the coating and a remaining portion of the beam is transmitted across the partially reflective coating, reflected by the fully reflective coating on the back surface and exits the element via an uncoated portion of the front surface. Two parallel output beams are thus provided that collectively include substantially the full power of the input beam. The relative powers of the output beams is determined by the characteristics of the partially reflective coating and the relative spacing is determined by the thickness of the element (e.g., any desired spacing including overlapping spacings can be achieved). The output beams can be targeted as desired for a particular application, e.g., directed to a detector or detectors via a sample and reference paths.

BRIEF DESCRIPTION OF THE DRAWINGS

For a more complete understanding of the present invention and further advantages thereof, reference is now made to the following detailed description taken in conjunction with the drawings, in which.

DETAILED DESCRIPTION OF THE INVENTION

Figure 1:
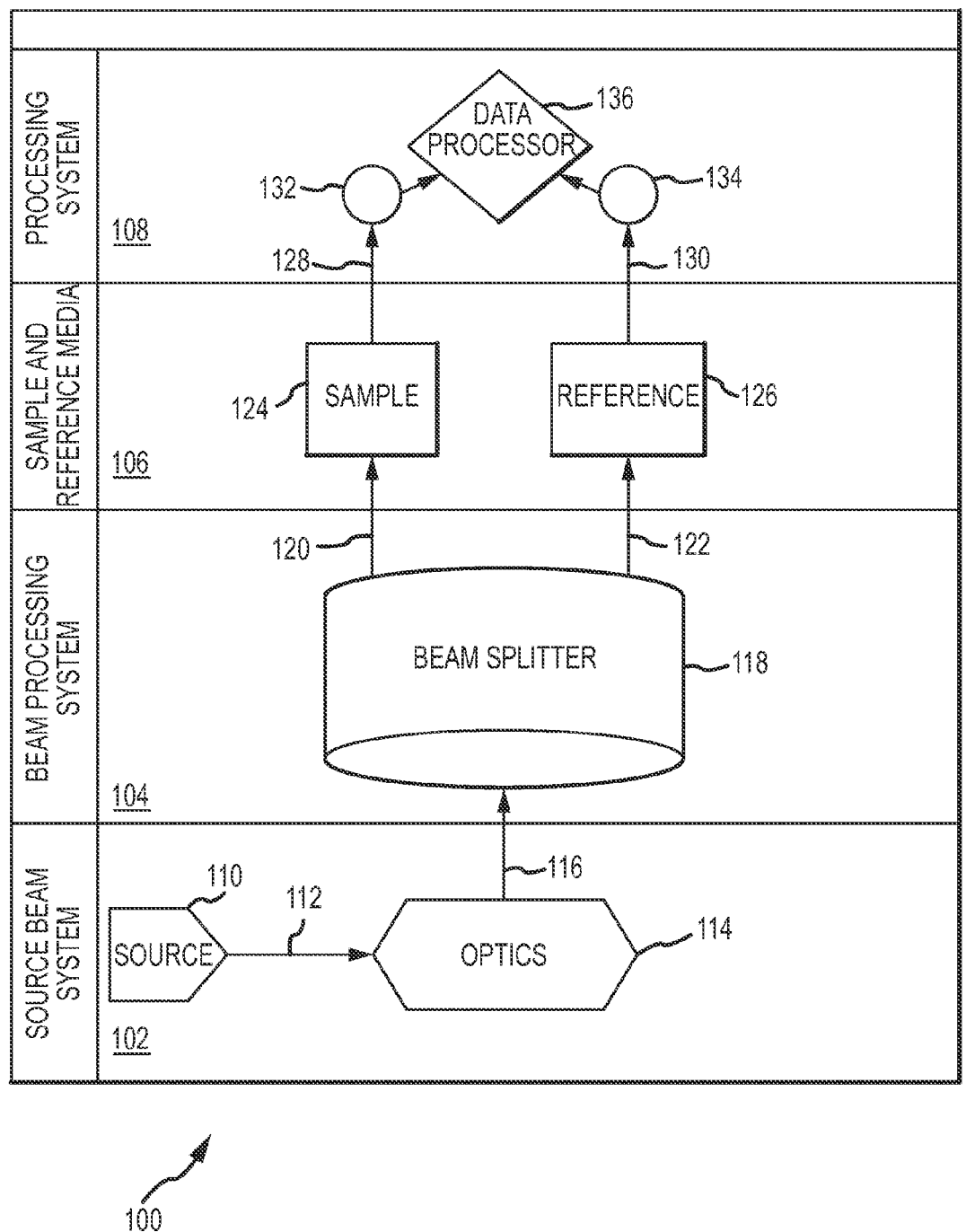
FIG. 1 is a diagram of an optical system for spectrographic analysis of a medium, in accordance with the present invention.

In the following description, the invention is primarily set forth in the context of a beamsplitter that splits an incident beam efficiently, accurately and without creating significant noise. Examples of other applications of the invention are also provided. It will be appreciated that various aspects of the invention have application beyond the specific contexts described below. Accordingly, this description should be understood as exemplifying the invention, and not by way of limitation.

In the following description, a spectroscopy system employing a beamsplitter to generate sample and reference beams is first described. Then an illustrative beamsplitter in accordance with the present invention is described. Thereafter, the functionality of the beamsplitter is described in detail. Finally, alternate embodiments and implementations of the invention including alternative beam processing functionalities are described.

Generally, the present invention is directed to interfacing a beam of radiation with a plurality of beams of radiation efficiently, accurately, with reduced creation of noise in general and specifically with reduced injection of noise into the signal. Such interfacing may involve beam splitting, beam combining and associated functionality. An anticipated application of this capability is the process of spectroscopy, particularly spectroscopy involving simultaneous illumination of sample and reference paths to obtain information regarding a sample, e.g., using a Beer's law analysis. The reference medium may have a composition that is known from a previous measurement or may otherwise provide information useful for calibration. This measurement may be termed a reference value and is often designated as the intensity value $I_o$. The spectroscopy also involves a sample of interest, and the measurement of the sample is generally compared with the reference value. The reference and sample media may be in gaseous, liquid or solid state form, and may or may not be enclosed in a container. The measurement of the reference may be performed simultaneously with the measurement of the sample. Such simultaneous measurement can provide the advantages of real-time acquisition of data and comparative analysis, among other advantages. In order to measure the sample and a reference simultaneously with minimal difference in path length, initial beam intensity or other path dependent artifact, it is advantageous to have parallel beams of light created from a single source beam. Thus, a parallel path beam splitter may be employed.

Such a beamsplitter element creates two parallel or nearly parallel beams and the efficiency and accuracy of the beamsplitter element and its function depend on many factors. In the case of the beamsplitter described below which includes a partially reflective coating, these factors include: the efficacy, thickness and control over the partially reflective coating; the preparation of the beamsplitter element surfaces; the properties (e.g. absorptive, refractive) of the materials used in the beamsplitter element, etc. Further, an important factor for efficient operation of the beamsplitter element, specifically in a spectroscopy system as described below, is the control of the incident angle and polarization of the source light. In particular, the present invention employs a Brewster angle geometry so as to avoid loss of light onto undesired paths and to enable accurate splitting of the power of the source beam as between the output beams (based on the properties of the partially reflective coatings).

1 FIG. 1 is a schematic diagram of an optical system 100, in accordance with the present invention, for spectrographic analysis of a medium using reference and sample optical paths. Generally, the spectroscopy system 100 includes a source beam system 102, a beam processing system 104, sample and reference media 106, and a processing system 108. It will be appreciated that FIG. 1 includes only some of the elements of a system configured to perform spectroscopy, and other elements such as lenses, filters, beam-directing units and non-optical elements may also be included as necessary.

The source beam system 102 includes a source 110 for generating light particularly chosen for the spectroscopic goals of the system. The illustrated source 110 creates source beam 112, which has a wavelength, intensity, collimation, focal length and polarization, among other things, which may all be controlled to optimize the output of the spectroscopy system 100. Optics 114, which may include a lens or another optical component, receives source beam 112 and provides input beam 116. Optics 114 may modify and/or control characteristics of the source beam 112 to produce the input beam 116, for example, the direction of the input beam 116 may be controlled in relation to the first surface of incidence of the beam processing system 104.

The beam processing system 104 includes a beamsplitter 118. In the illustrated system 100, the input beam 116 is split, by the beamsplitter 118 into two output beams 120 and 122. As will be described in more detail below, the beamsplitter 118 preferably includes a monolithic element that separates input beam 116 into output beams 120 and 122 using a partially reflective coating. More specifically, a fraction of the input beam 116 is reflected by the partially reflective coating at the point of incidence of the input beam 116. The remaining light is refracted completely or nearly completely into the beamsplitter element. The complete or nearly complete refraction is due to the angle of incidence being at exactly or nearly the Brewster angle for the particular wavelength of the source light and the indices of the refraction of the materials through which the light travels. The refracted light (i.e. the portion of input beam 116 not initially reflected) then is transmitted through the beamsplitter element, is reflected off a back surface of the element and is transmitted out of the element at the front surface. The exiting light is at exactly or nearly the Brewster angle for the transition out of the beamsplitter element. The light is refracted onto an optical path parallel or nearly parallel to the optical path of the originally reflected light.

Thus, the light traveling from the illustrated beamsplitter 118 comprises two parallel or nearly parallel beams, 120 and 122. These beams travel into the sample and reference media 106 (which may be contained in cells or be free depending on the application), and are individually directed at either a sample 124 under analysis or a reference fluid or material 126. The media may be in gaseous, liquid or solid state form. The distance between the centers of the two beams 120 and 122 may be controlled for a given system geometry by the thickness of the beamsplitter 118, namely the distance between the first and second surfaces referenced above. This further allows for a compact design of the spectrographic system 100.

Beams 128 and 130 from volumes 28 travel to processing system 108 and are received by detectors 132 and 134 and data from the detectors 132 and 134 are transmitted to data processor 136. Data processor 136 may include specific processing configurations useful for spectrographic analysis including processing algorithms and memory for storage of data. In this manner, for example, information regarding a composition of the sample (e.g., a concentration of a sample component of interest) can be calculated.

Figure 2:
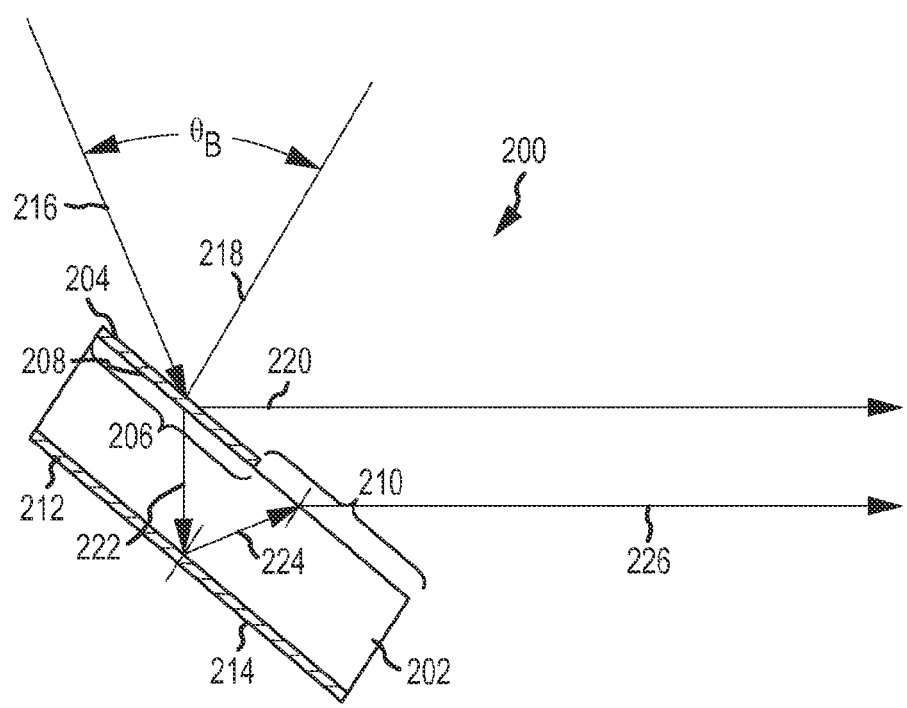
FIG. 2 illustrates a beamsplitter in accordance with the present invention.

FIG. 2 is a side view of a beamsplitter 200 which may be used in the system 100 of FIG. 1. The illustrated beamsplitter 200 includes a substrate 202 having a partially reflective coating 204 disposed on a first portion 206 of a front surface 208. A remaining portion 210 of the front surface 208 is uncoated. In the illustrated embodiment, a back surface 212 of the substrate 202 (or at least the portion of the back surface on which the beam is incident as described below) is coated with a fully reflective coating 214. It will be appreciated that the terms "partially reflective" and "fully reflective" relate to the light used for a particular application. For example, the partially reflective coating 204 may be composed of alternating high index of refraction and low index of refraction coating layers, where the thicknesses of these coating layers and the number of the layers is selected to provide the desired level of reflectivity for a given wavelength of light. Accordingly, the coating 204 may be specific to a particular wavelength or wavelength range. The coating 214 may also be designed for a particular wavelength or wavelength range or may be a broadband reflective coating such as a silver coating. In the illustrated embodiment, the front 208 and back 212 surfaces are substantially parallel.

In operation, an input beam 216 is incident on the coating 204 with a Brewster angle geometry. More specifically, the illustrated beam 216 is composed of p-polarized radiation and defines a Brewster angle relative to a vector normal to the surface of coating 204. The partially reflective coating 204 reflects a portion of input beam 216 to form a first output beam 220. Because of the Brewster angle geometry, substantially all of the input beam 216 which is not reflected is transmitted into the substrate 202 as beam 222. Beam 222 is substantially completely reflected by coating 214 to form reflected beam 224. Because of the parallel surface geometry of the substrate 202, reflected beam 224 is incident on the uncoated portion 210 of surface 208 with a Brewster angle geometry. As a result, reflected beam 224 is substantially fully refracted (transmitted) across surface 208 to form a second output beam 226. That is, substantially none of the beam 224 is reflected at the surface 208. Output beams 220 and 226 thus include substantially all of the power of input beam 216.

Moreover, the relative powers of the beams 220 and 226 are determined by the reflectance of the coating 204 with respect to input beam 216 which can be carefully controlled through design of the coating 204. Thus, for example, beam 220 and 226 will have the same intensities if the coating 204 provides 50% reflectance with respect to input beam 216. It is further noted that the output beams 220, 226 will be substantially parallel and the spacing between the beams 220, 226 is determined by the thickness of the substrate 202 together with the angles of refraction and reflection of the various beams. Thus, substantially any desired relative spacing of the beams 220, 226 can be achieved by appropriate selection of the substrate 202. Furthermore, due to the monolithic design of the beamsplitter 200, the beamsplitter 200 can be inexpensively and reliably manufactured and provides output beams 220 and 226 with minimal artifact.

Figure 3:
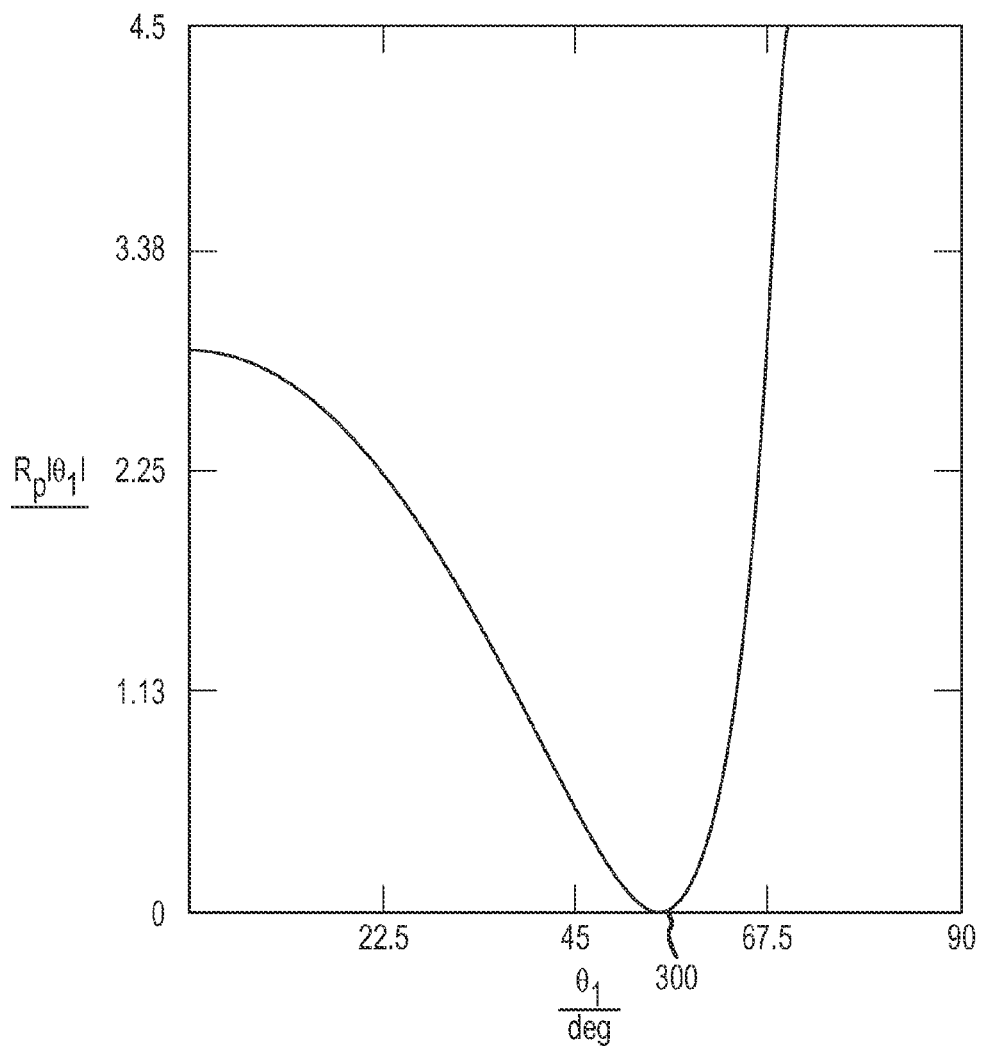
FIG. 3 is a graph of the reflectance of p-polarized radiation as a function of angle of incidence for the optical medium of $C_aF_2$ (Calcium Fluoride)

FIG. 3 is a graph illustrating an example of how reflectance varies as a function of angle of incidence for the optical medium of $C_a F_2$ Calcium Fluoride. It will be understood that the minimum reflection point 300 corresponding to a reflectance of substantially 0, defines the Brewster angle for the application under consideration. In this case, the Brewster angle is at approximately 55°. However, it is also noted that low levels of reflectance occur for a significant wavelength range around the Brewster angle. Indeed, reflectance changes very slowly as a function of angle for an angular range close to the Brewster angle. Consequently, precise alignment of the optical elements of a system such as described above, so that the input beam is incident on the beamsplitter with a Brewster angle geometry, is not required. Moreover, the incidence angle can be varied slightly from the Brewster angle geometry while still substantially achieving important advantages of the present invention. For example, in the case of FIG. 3, it can be seen that a reflectance substantially smaller than 1% can be attained for a wavelength range of about 10° surrounding the Brewster angle. Accordingly, within such a range, a highly efficient beamsplitter can be realized with the relative powers of the output beams carefully controlled as described above.

Figure 4:
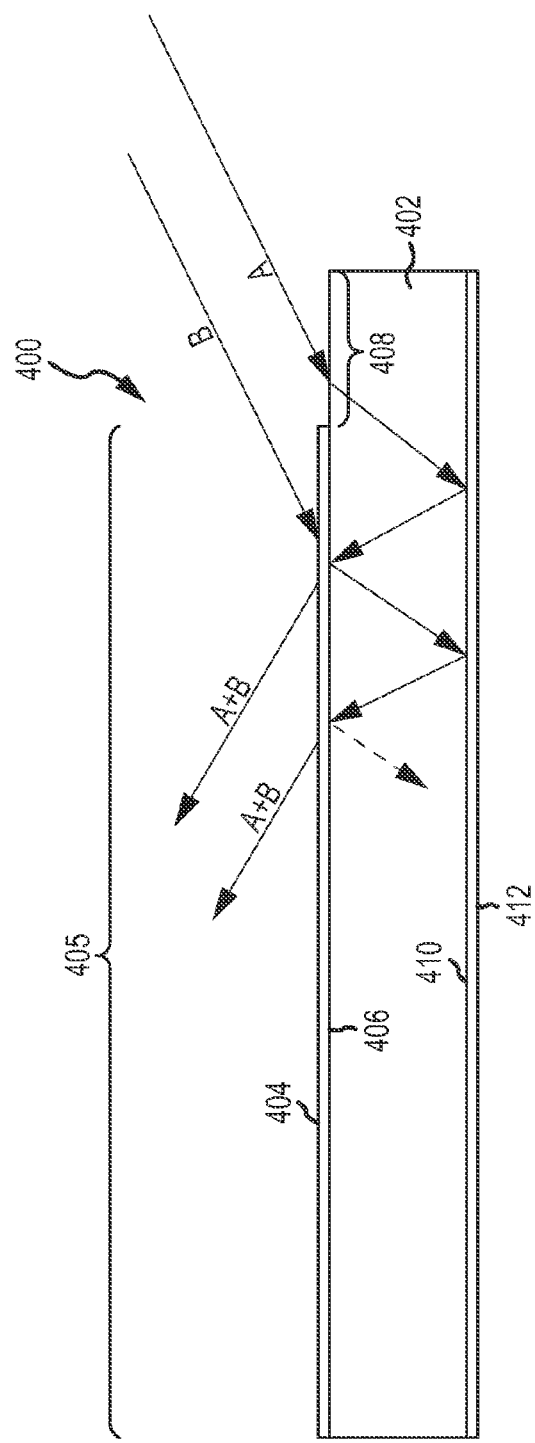
FIGS. 4-6 illustrate various embodiments of an optical multiplexer in accordance with the present invention.

As noted above, the invention is not limited to beamsplitter applications. Rather, the invention is useful in connection with a variety of beamsplitter, beam combiner, multiplexing, demultiplexing and drop/add functionalities. Examples in this regard are provided in FIGS. 4-9. Referring first to FIG. 4, a beam multiplexer 400 is shown. The structure of the multiplexer 400 may be substantially identical to that described above in connection with FIG. 2. Specifically, the multiplexer 400 includes a transmissive substrate 402 having a partially reflective coating 404 covering a portion 405 of a front surface 406 thereof, with a remaining portion 408 of the front surface 406 uncoated. A back surface 410 of the substrate 402 is coated with a substantially fully reflective coating 412.

In the illustrated implementation, two input beams, designated beam A and beam B are incident on the front surface 406 of the substrate 402. More specifically, beam A is incident on the uncoated portion 408 of the front surface 406 and beam B is incident on the coated portion 405. Both of the beams are incident on the substrate with a Brewster geometry. Accordingly, beam A is refracted and substantially fully transmitted into the substrate 402 and is fully reflected at the back surface 410. Beam A is then partially reflected and partially transmitted at the coated portion 405 of the front surface 406. At the same location on the coated portion 405 of the front surface 406, beam B is incident on the front surface 406 where beam B is partially reflected by the partially reflective coating 404 and partially transmitted into the substrate 402. As a result, a combined beam A+B is transmitted from the front surface 406 at this location and a second combined beam A+B is reflected to the back surface 410. This second beam may then be transmitted out of the substrate via an uncoated portion of the front surface (not shown) or a portion of the second combined beam A+B may be transmitted at a second location within the coated portion 405 of the front surface 406. In this manner, two or more combined beams A+B are output at a Brewster geometry in relation to the front surface 406 of the substrate as may be desired for certain applications.

Figure 5:
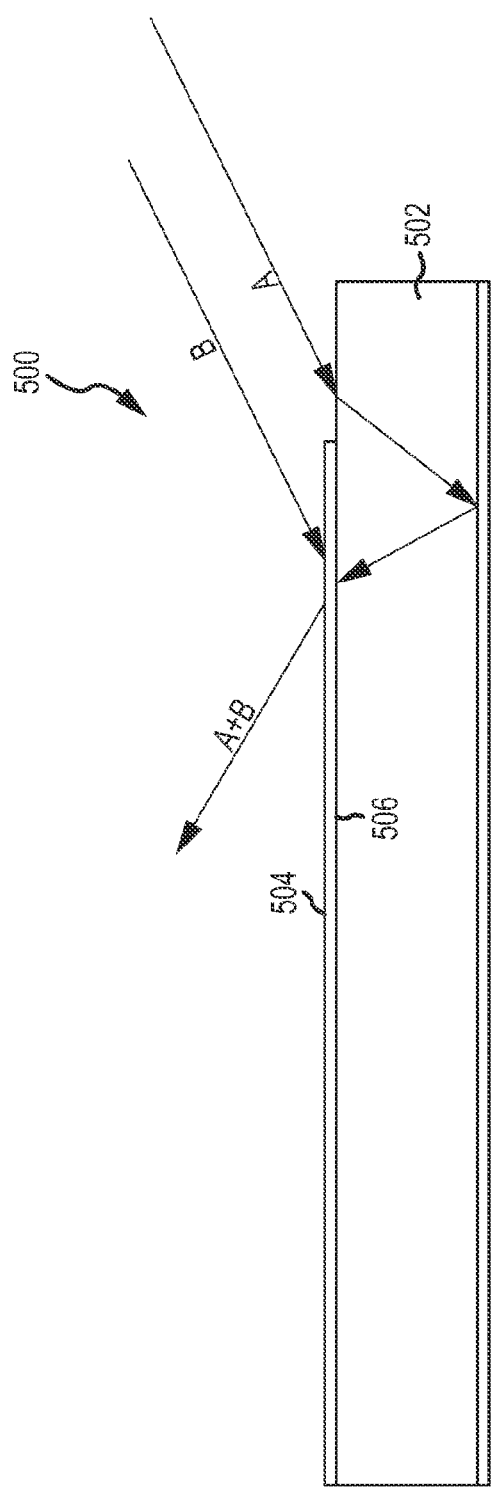

In some cases, it may be desired to provide a single combined output beam. FIG. 5 illustrates a further alternative multiplexer 500 in this regard. The multiplexer 500 includes a substrate 502 with a partially reflective coating 504 on the front surface 506 and a fully reflective coating 508 on the back surface 510. The partially reflective coating 504 on the front surface 506 is operative to reflect beam B but transmits beam A. For example, beams A and B may be monochromatic beams of different wavelengths and the coating may be a dichroic coating for selectively reflecting a wavelength range including the wavelength of beam B while transmitting a wavelength range including the wavelength of beam A.

Figure 6:
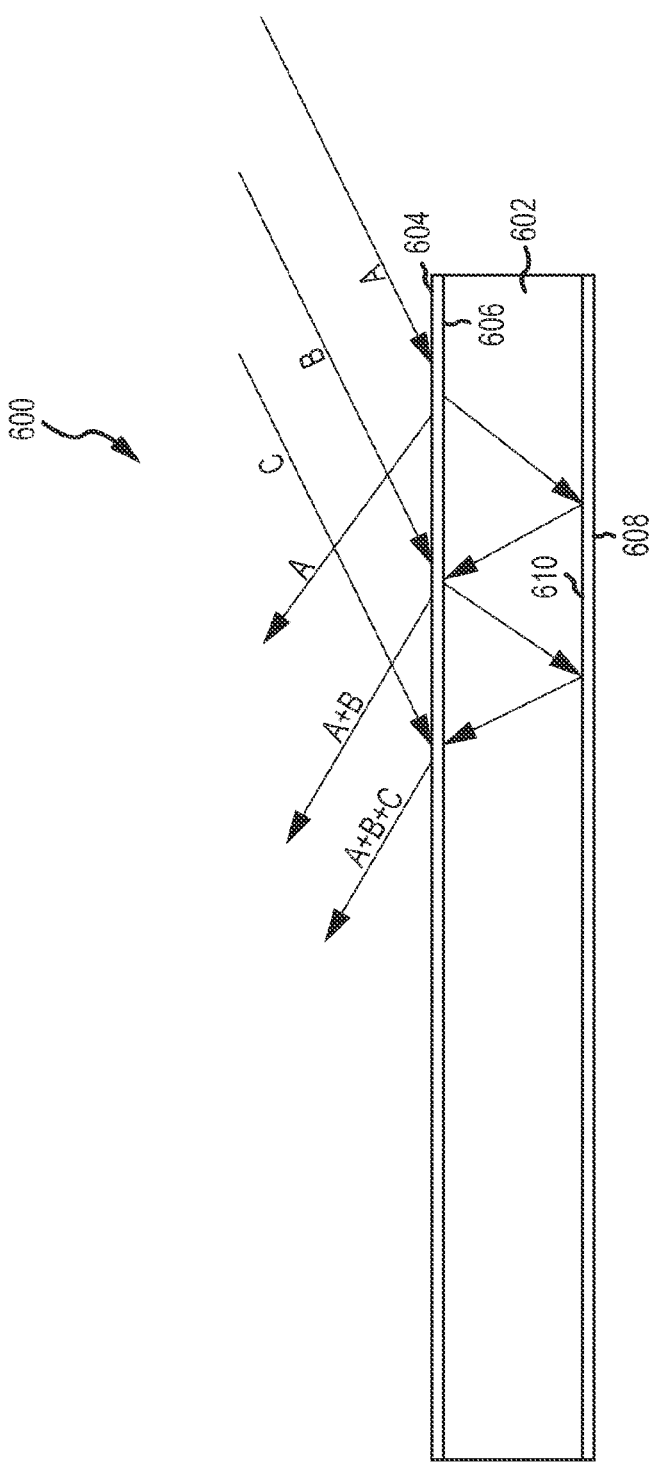

It will be appreciated that the invention is not limited to combining two signals. This is illustrated in FIG. 6 which shows, for purposes of illustration, a multiplexer 600 for selectively combining input beams A, B and C. Specifically, the multiplexer 600 includes a substrate 602 with a partially reflective coating 604 disposed on a front surface 606 thereof and a substantially fully reflective coating 608 disposed on a back surface 610 thereof. Thus, each of the beams A, B and C is partially reflected and partially transmitted by the partially reflective coating. The spatial geometry of the beams and multiplexer 600 is selected such that beam B is incident on the front surface 606 at the location where the transmitted portion of beam A is reflected back to the front surface 606. Generally, beam C is incident on the front surface 606 at the location where the internally reflected beam A+B returns to the front surface 606. Accordingly, the output beams include output beams A, A+B, and A+B+C. It will be appreciated that a greater number of beams may be multiplexed in this regard.

Figure 7:
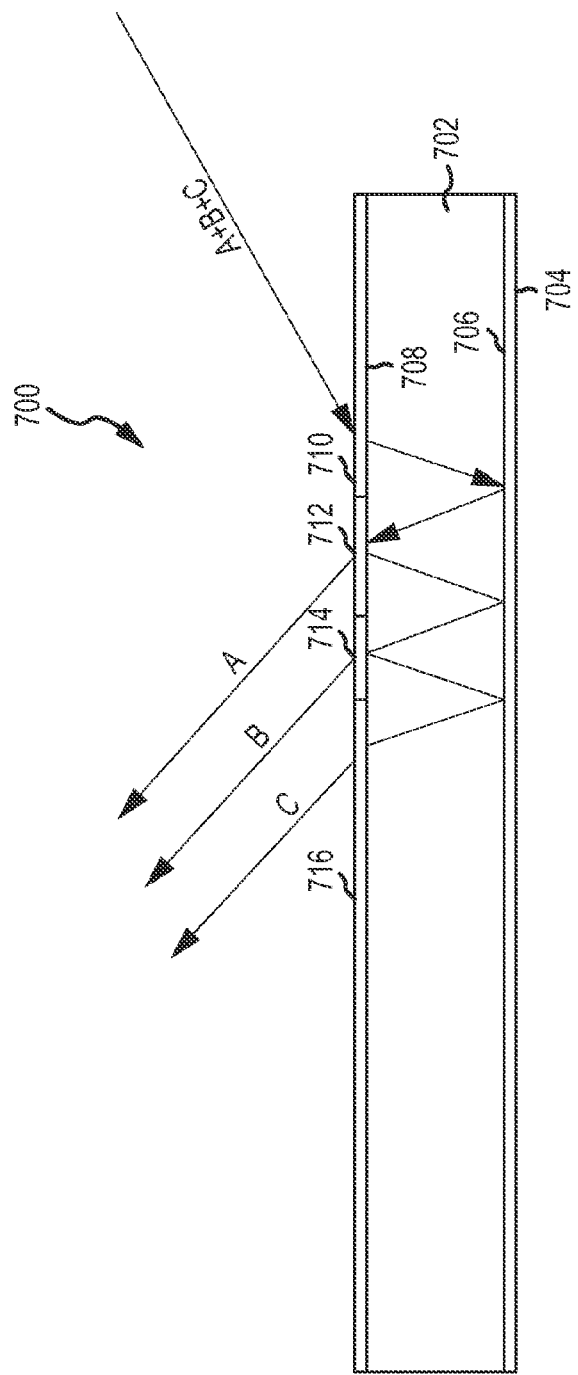
FIG. 7 illustrates an optical demultiplexer in accordance with the present invention.

The invention is also useful for demultiplexing a multiplexed beam as illustrated in FIG. 7. The illustrated demultiplexer 700 includes a transmissive substrate 702 having a fully reflective coating 704 on a back surface 706. The front surface 708 includes a number of coatings 710, 712, 714, and 716 disposed on different portions thereof. As shown, a multiplexed beam, including components identified as A, B and C is incident on the multiplexer 700 at a first area of the front surface 708 which may be uncoated or coated with a coating 710 that is substantially fully transmissive with respect to components A, B and C. The combined beam is thus transmitted through the substrate and reflected off of the back surface 706 and is then incident on a second coating 712. The second coating 712 is fully reflective with respect to components B and C but transmits component A. The remaining components B and C are reflected by the second coating 712 and the back surface such that they are incident on a third coating portion 714. The third coating 714 transmits the component B but reflects the component C. The remaining component C is then reflected again at the back surface 706 and is incident on the front surface 708 in area which may be uncoated or coated with a coating 716 that is transmissive with respect to component C. In the embodiment of FIG. 7, the input multiplexed beam may be incident on the multiplexer 700 with a Brewster geometry. In addition, one or more of the separated beams A, B and C may exit the multiplexer 700 with a Brewster geometry.

Figure 8:
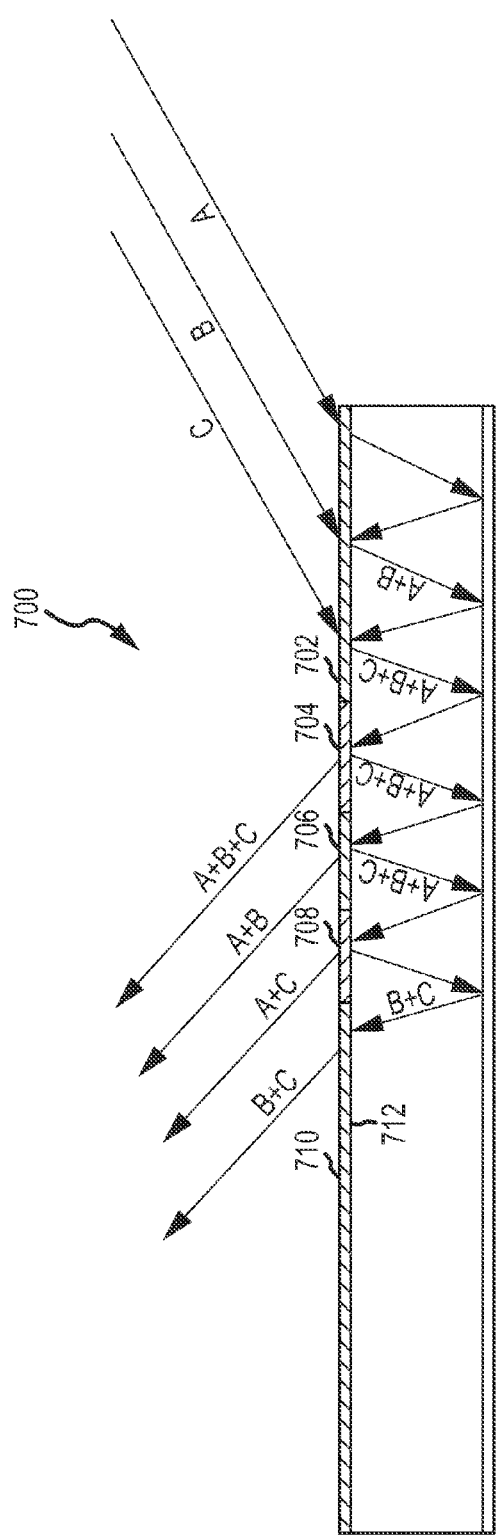
FIGS. 8 and 9 illustrate implementations for multiplexing, demultiplexing, adding and dropping optical beams in accordance with the present invention.
Figure 9:
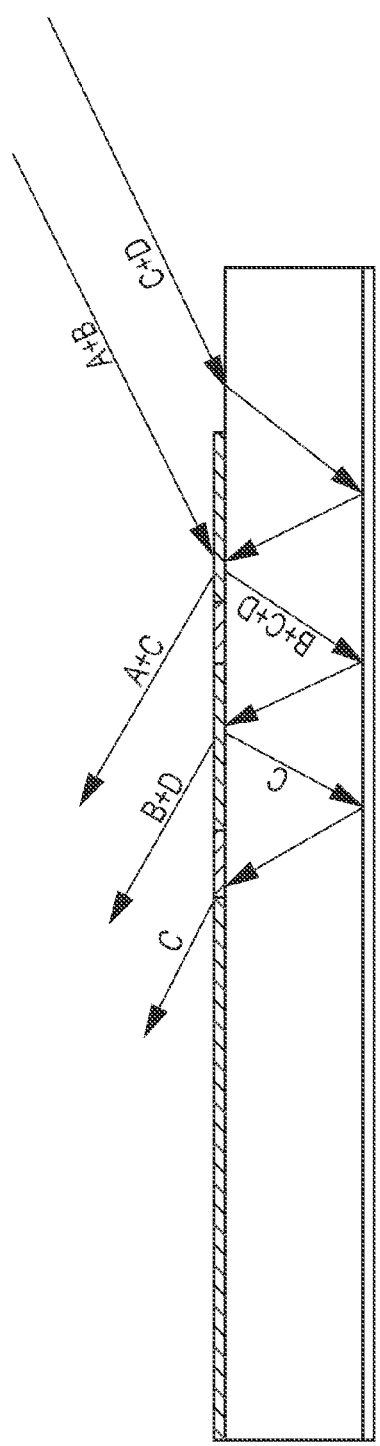

It will be appreciated that the invention is not limited in this regard to either multiplexing or demultiplexing but may implement more complicated beam processing techniques involving multiplexing, demultiplexing and adding or dropping signal components from a given signal pathway. This is illustrated in FIGS. 8 and 9. Specifically, in FIG. 8, three different single component beams (A, B and C) are incident on the element 700 and, by way of appropriate coatings 702, 704, 706, 708 and 710 on the front surface 712, are combined in a variety of ways to provide output signals (A+B+C, A+B, A+C, and B+C). In FIG. 9, two multicomponent input signals (A+B and C+D) are separated and recombined to provide a number of output signals including one single component output signal.

While various embodiments of the present invention have been described in detail, it is apparent that further modifications and adaptations of the invention will occur to those skilled in the art. However, it is to be expressly understood that such modifications and adaptations are within the spirit and scope of the present invention.

What is claimed:

1. An optical element, comprising:
    a substantially transmissive medium;
    said substantially transmissive medium having a first surface substantially parallel to a second surface;
    a first coating disposed at a first location on said first surface said first coating being partially reflective with respect to an incident beam having a single first wavelength and a single polarization; and
    a second coating disposed at a second location on said second surface said second coating being substantially fully reflective with respect to light of said first wavelength;
    wherein said first surface includes a third location that is substantially devoid of said first coating;
    wherein said element is configured such that a first portion of said beam incident on said first surface at said first location with a Brewster angle geometry is transmitted through said medium to said second location and is fully reflected by said second coating to said third location of said first surface such that a first output beam exits said medium with a Brewster angle geometry, and a second portion of said beam incident on said first surface at said first location is reflected to form a second output beam, said first and second output beams each having said first wavelength and being substantially parallel, said first and second beams further having first and second powers, wherein the sum of said first and second powers is substantially equal to an power of said incident beam.

2. An optical element as set forth in claim 1, wherein a first transmission path is defined between said first location on said first surface and said second location on said second surface, and a second transmission path is defined between said third location on said first surface and said second location on said second surface;
    wherein light is reflected between said first transmission path and said second transmission path at said second location.

3. An optical element as set forth in claim 1, wherein said first surface is substantially wholly transmissive at said third location with respect to light transmitted between said second location and said third location.

4. An optical apparatus, comprising:
    an optical element having first and second opposite surfaces, said first and second opposite surfaces defining optical interfaces for processing an optical beam;
    said first surface including a first area having a partially reflective coating with respect to a given beam, having a single wavelength and a single polarization, and beam angle and a second area being free of said coating; and
    said second surface having a third area effective for at least partially redirecting said given beam from said first area of said first surface to said second area of said first surface;
    wherein said optical element is configured such that said beam is incident on said first surface at said first area with a Brewster angle geometry.

5. An optical apparatus as set forth in claim 4, wherein said first and second opposite surfaces are arranged in a substantially parallel configuration.

6. An optical apparatus as set forth in claim 4, wherein said first area of said first surface has a higher reflectance than said second area of said first surface.

7. An apparatus as set forth in claim 4, wherein said partially reflective coating provides about 50% reflectance with respect to a particular beam splitting application.

8. An optical apparatus as set forth in claim 4, wherein said second area of said first surface is substantially wholly transmissive with respect to light transmitted between said second area and said third area.

9. An optical apparatus as set forth in claim 4, wherein said second area of said first surface is substantially free of any reflective coating.

10. An apparatus as set forth in claim 4, wherein said third area of said second surface is substantially wholly reflective.

11. A method for use in processing light, comprising the steps of:
    providing an optical element having first and second opposite surfaces, wherein said first surface has a first area with a first partially reflective coating for a given beam, having a single wavelength and a single polarization, and beam geometry and a second area free of said first partially reflective coating, and said second surface has a third area;
    first transmitting a first optical beam relative to said first area of said first surface such that said beam is incident on said first area of said first surface at a Brewster angle geometry;
    second transmitting a second optical beam relative to said second area of said first surface; and reflecting, at said third area of said second surface, at least a portion of one of said beams between said first area of said first surface and said second area of said first surface.

12. A method as set forth in claim 11, wherein said step of first transmitting comprises operating a source to transmit said optical beam such that said optical beam is externally incident on said first area of said first surface.

13. A method as set forth in claim 11, wherein said step of first transmitting comprises at least partially passing said optical beam across said first area of said first surface between an interior and an exterior of said optical element.

14. A method as set forth in claim 11, wherein said second optical beam comprises a portion of said first optical beam passed through and first portion of said first surface and reflected by said third area of said second surface.

15. A method as set forth in claim 11, further comprising the step of partially reflecting said optical beam from said first area of said first surface to provide a first output beam.

16. A method as set forth in claim 15, wherein said step of second transmitting comprises passing, across said second area of said first surface, a reflected portion of said first optical beam, so as to provide a second output beam.

17. An optical system, comprising:
a first optical source for providing an input optical beam having a single first wavelength, single polarization, and first power;
an optical element including at least a first input surface area, having a partially reflective coating with respect to said input optical beam, for receiving said input optical beam and at least a first output surface area for transmitting a first output beam having said first wavelength and a second power, wherein said first output beam is transmitted from said first output surface area substantially at a Brewster angle geometry;
a second output surface area, separate from said first output surface area, for transmitting a second output beam having said first wavelength and a third power substantially equal to said second power, wherein said second output surface area is separate from said first input surface area and the sum of said second and third powers is substantially equal to said first power.

18. An optical system as set forth in claim 17, wherein said optical source and said optical element are configured such that at least a portion of said input beam passes through said optical element between said first input surface area and said first output surface area so as to define an optical path therebetween, wherein substantially the entirety of said portion of said input beam on said optical path is transmitted across said output surface area to form said first output beam.

19. An optical system as set forth in claim 18, wherein said optical path between said first input surface area and said first output surface area is folded.

20. An optical system as set forth in claim 18, wherein said optical element further includes an intermediate surface area, between said first input surface area and said first output surface area, operative for at least partially reflecting said portion of said input beam.

21. An optical system as set forth in claim 17, wherein said second output beam is transmitted from said second output surface area substantially at a Brewster angle geometry.

22. An optical system as set forth in claim 17, wherein said first input surface area is operative for partially reflecting said input optical beam.

23. An optical system as set forth in claim 17, wherein said first optical source and said optical element are configured such that said input optical beam is incident on said first input surface area at a Brewster angle geometry.

24. A method for use in processing light, comprising the steps of:
providing an optical element having a first partially reflective surface area, that is partially reflective with respect to an optical beam having a single wavelength and a single polarity, operative to reflect a first portion of said optical beam so as to provide a first output beam; and
transmitting said optical beam onto said partially reflective surface area so as to define a Brewster angle geometry;
transmitting a second portion of said optical beam from a second surface area of said optical element, separate from said first area, so as to provide a second output beam; and
transmitting said first and second output beams from said optical element in a parallel fashion.

25. A method as set forth in claim 24, further comprising transmitting said second output beam from said optical element with a Brewster angle geometry.

26. An optical beam splitter, comprising:
an optical source for providing an input beam having a single first wavelength, a single first polarity, and a first power;
a beam splitter element including a transmissive medium having opposing front and back surfaces, wherein a portion of the first surface is coated with a partially reflective coating that is partially reflective with respect to said first wavelength and first polarity, and at least a portion of the back surface is coated with a substantially fully reflective coating and a second portion of the front surface is substantially uncoated; and
first and second output targets for receiving first and second output beams having said first wavelength from said beam splitter element, wherein said output beams have second and third powers, respectively, where the sum of said second and third powers is substantially equal to said first power;
wherein said beam splitter element is disposed in relation to an optical path of said input beam such that said input beam is incident on said first portion of said front surface with a Brewster angle geometry.

27. An optical beam splitter as set forth in claim 26, wherein said beam splitter element is configured such that at least one of the said first and second output beams is transmitted from said optical element at a Brewster angle geometry.

28. An optical beam splitter as set forth in claim 26, wherein said portion of said back surface is operative for reflecting light between said first and second portions of said surface.

29. An optical beam splitter as set forth in claim 26, wherein said first and second targets comprise detector elements for detecting said first and second output beams.

30. An optical beam splitter as set forth in claim 29, wherein said first and second output beams traverse first and second fluid samples, and said beam splitter further comprises a processor operative to process output from said detector elements to provide information regarding one of said fluid samples.

* * * * *